United States Patent
Yang

(10) Patent No.: US 8,456,288 B2
(45) Date of Patent: Jun. 4, 2013

(54) COMMUNICATION DEVICE AND UNLOCKING ALARM METHOD THEREOF

(75) Inventor: Yao-Yu Yang, Shenzhen (CN)

(73) Assignees: Shenzhen Futaihong Precision Industry Co., Ltd., Shenzhen (CN); Chi Mei Communication Systems, Inc., New Taipei (TW)

(*) Notice: Subject to any disclaimer, the term of this patent is extended or adjusted under 35 U.S.C. 154(b) by 280 days.

(21) Appl. No.: 12/852,528

(22) Filed: Aug. 9, 2010

(65) Prior Publication Data

US 2011/0169620 A1 Jul. 14, 2011

(30) Foreign Application Priority Data

Jan. 9, 2010 (CN) .......................... 2010 1 0300163

(51) Int. Cl.
G08B 1/00 (2006.01)

(52) U.S. Cl.
USPC ............... 340/309.16; 340/539.1; 340/309.2; 340/309.3; 340/309.9; 340/309.7; 368/244; 368/251; 368/224; 368/243; 368/97; 379/373.02; 379/373.04

(58) Field of Classification Search
USPC .................. 340/309.16, 309.2, 309.3, 309.4, 340/309.5, 309.6, 309.7, 309.8, 309.9, 539.1; 368/244, 251, 73, 224, 243, 97, 98; 379/373.02, 379/373.04
See application file for complete search history.

(56) References Cited

U.S. PATENT DOCUMENTS

| | | | | |
|---|---|---|---|---|
| 4,962,367 A * | 10/1990 | Tymn | .......................... | 340/309.4 |
| 5,089,998 A * | 2/1992 | Rund | .............................. | 368/72 |
| 5,497,141 A * | 3/1996 | Coles et al. | ................. | 340/309.7 |
| 5,715,308 A * | 2/1998 | Shankarappa | ........... | 379/373.02 |
| 6,477,117 B1 * | 11/2002 | Narayanaswami et al. | ... | 368/251 |
| 8,125,319 B2 * | 2/2012 | Freeman | ................... | 340/309.16 |
| 8,218,403 B2 * | 7/2012 | Scott et al. | ..................... | 368/244 |
| 2007/0057775 A1 * | 3/2007 | O'Reilly et al. | .............. | 340/309 |
| 2009/0010108 A1 * | 1/2009 | Li et al. | ........................... | 368/73 |

* cited by examiner

*Primary Examiner* — Benjamin C Lee
*Assistant Examiner* — Chico A Foxx
(74) *Attorney, Agent, or Firm* — Altis Law Group, Inc.

(57) ABSTRACT

A communication device locks input of the communication device and executes an alarm if a current time reaches a set alarm time. When the alarm is executed, an unlock input set is generated for unlocking the input and an alarm disable button set is generated for disabling the alarm. If an unlock input set is the same as the generated unlock keypad set, the locked input is unlocking. If the alarm disable button set input by the user is the same as the generated alarm disable button set, the communication device disables the alarm.

12 Claims, 3 Drawing Sheets

COMMUNICATION DEVICE AND UNLOCKING ALARM METHOD THEREOF

BACKGROUND

1. Technical Field

Embodiments of the present disclosure relate to an alarm, and more particularly to a communication device and an alarm unlocking method for the communication device.

2. Description of Related Art

An alarm function is provided in many communication devices. An alarm provided in a communication device often allows the alarm to be set to sound at a specific time. Many devices further provide a snooze alarm function, allowing an additional preset time to pass before the alarm is again issued. However, the snooze function may allow oversleeping, despite the presence of the alarm function.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as, for example, Java, C, or assembly. One or more software instructions in the module may be embedded in firmware, such as an EPROM. It will be appreciated that module may comprise connected logic units, such as gates and flip-flops, and may comprise programmable units, such as programmable gate arrays or processors. The module described herein may be implemented as either software and/or hardware module and may be stored in any type of computer-readable medium or other computer storage device.

Figure 1:
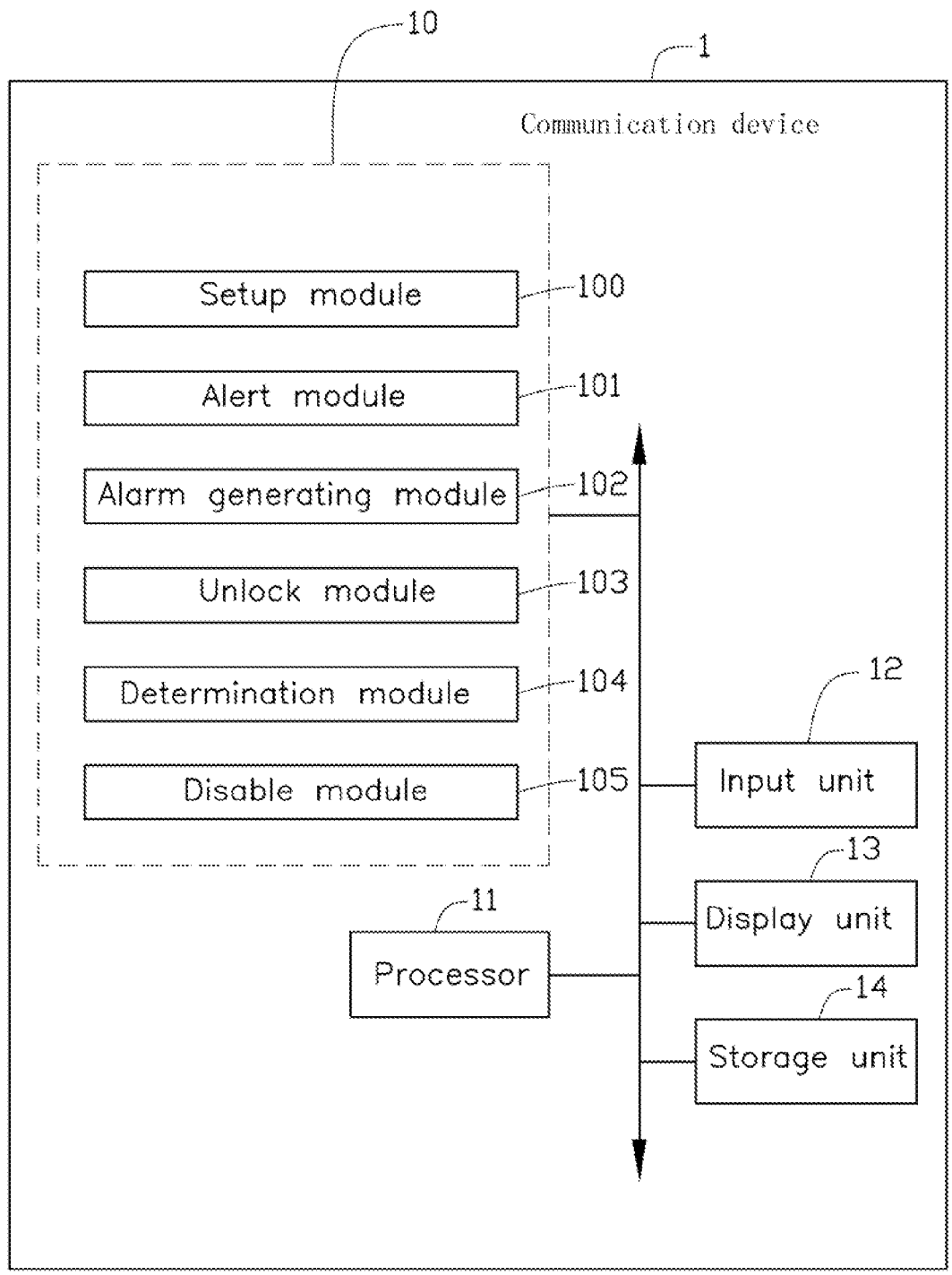
FIG. 1 is a block diagram of one embodiment of a communication device.

FIG. 1 is a block diagram of one embodiment of a communication device 1. In one embodiment, the communication device 1 includes at least one processor 11, an input unit 12, a display unit 13, a storage unit 14, and one or more programs including a setup module 100, an alert module 101, an alarm generating module 102, an unlock module 103, a determination module 104 and a disable module 105. Depending one the embodiment, the communication device 1 is a mobile phone. In other embodiments, the communication device 1 may be any electronic device, such as a notebook computer, handheld computer, or personal digital assistant (PDA), for example.

The communication device 1 is generally controlled and coordinated by operating system software, such as the UNIX, Linux, Windows 95, 98, NT, 2000, XP, Vista, Mac OS X, an embedded operating system, or any other compatible operating systems. In other embodiments, the electronic device 1 may be controlled by a proprietary operating system. Conventional operating systems control and schedule computer processes for execution, perform memory management, provide file system, networking, and I/O services, and provide a user interface, such as a graphical user interface (GUI), among other things.

The processor 11 is operable to execute one or more computerized codes stored in the storage unit 14 to provide functions for the setup module 100, the alert module 101, the alarm generating module 102, the unlock module 103, the determination module 104 and the disable module 105. The processor 11, as an example, may include a CPU, math coprocessor, or a shift register.

The input unit 12 allows entry of parameters of the system 10, such as time and ring tone for the alarm. The input unit 12 further allows input data to access the information of the communication device 1. The input unit 12 can be a keypad, or a plurality of hard keys of the communication device 1.

The display unit 13 is operable to display processed information in the communication device 1. In addition, the display unit 13 is operable to provide a graphic user interface (GUI) for input of data, and may be a display screen, a resistive touch screen, or a capacitive touch screen.

The storage unit 14 is electronically connected to the system 10, the processor 11, the input unit 12, and the display unit 13. The storage unit 14 is operable to store data such as a customization function code of the communication device 1, computerized codes of the system 10, programs of an operating system and other applications of the communication device 1. The storage unit 14 may include a hard disk drive, flash memory, RAM, ROM, cache, or external storage mediums.

The setup module 100 is operable to set an alarm time of the communication device 1, such as 18:00. In addition, the setup module 100 is further operable to determine whether a current time of the communication device 1 matches the set alarm time of the communication device 1.

The alert module 101 is operable to issue an alarm if the current time matches the set alarm time of the communication device 1.

The alarm generating module 102 is operable to lock the input unit 12 of the communication device 1 and generate an unlock input set to unlock the communication device 1. In one embodiment, the input unit 12 can be a keypad of the communication device 1 and a plurality of external function buttons, such as a power button, a volume level button and a camera button. The alarm generating module 102 assigns a different identification number to each external function button, such as KEY_1, KEY_2, KEY_3, . . . KEY_N to the power button, the volume level button, the camera button, and the corresponding function buttons, wherein the number N is the number of external function buttons. For example, the alarm generating module 102 can generate the unlock input set composed of the power button and the camera button corresponding to the KEY_1 and KEY_3. Accordingly, the alarm generating module 102. further generates the unlock set composed of the number key 1 and the number key 2 of the keypad corresponding to the KEY_4 and KEY_5.

Accordingly, the alarm generating module 102 is further operable to generate an alarm disable button set. The alarm disable button set is a set of buttons composed by a plurality of external function buttons to disable the alarm. The alarm generating module 102 assigns a different identification number to each external function button, such as CODE_1, CODE_2, CODE_3, . . . CODE_N to the power button, the volume level button, the camera button, and the corresponding function buttons, wherein the number N is the number of external function buttons. For example, the alarm generating module 102 can generate the alarm disable button set composed of the power button entered twice corresponding to the CODE_1 and CODE_1. Accordingly, the alarm generating module 102 further can generate the alarm disable button set composed of the number key 1 entered twice corresponding to the CODE_4 and CODE_4.

The unlock module 103 is operable to send information of the generated unlock input set to the display unit 13, from where it can be used to unlock the communication device 1. In addition, the unlock module 103 is operable to receive the unlock input set by the user and determine whether the unlock input set matches the unlock input set generated by the alarm generating module 102. For example, if the unlock input set matches the generated unlock input set, the unlock module 103 determines the unlock input set is correct and unlocks the communication device 1. Otherwise, the device remains locked.

The determination module 104 is operable to send information of the alarm disable button set to the display unit 13, from where it can be used to disable the alarm. In addition, the determination module 104 is operable to receive the alarm disable button set and determine whether the input alarm disable button set matches the alarm disable button set generated by the alarm generating module 102. For example, if the input alarm disable button set matches the generated alarm disable button set, the determination module 104 determines the input alarm disable button set is correct and sends a disable signal to the disable module 105. Otherwise, the determination module 104 sends a void signal to the disable module 105.

The disable module 105 is operable to receive signals from the determination module 104 and disable the alarm upon detecting the disable signal from the determination module 104.

Figure 2A:
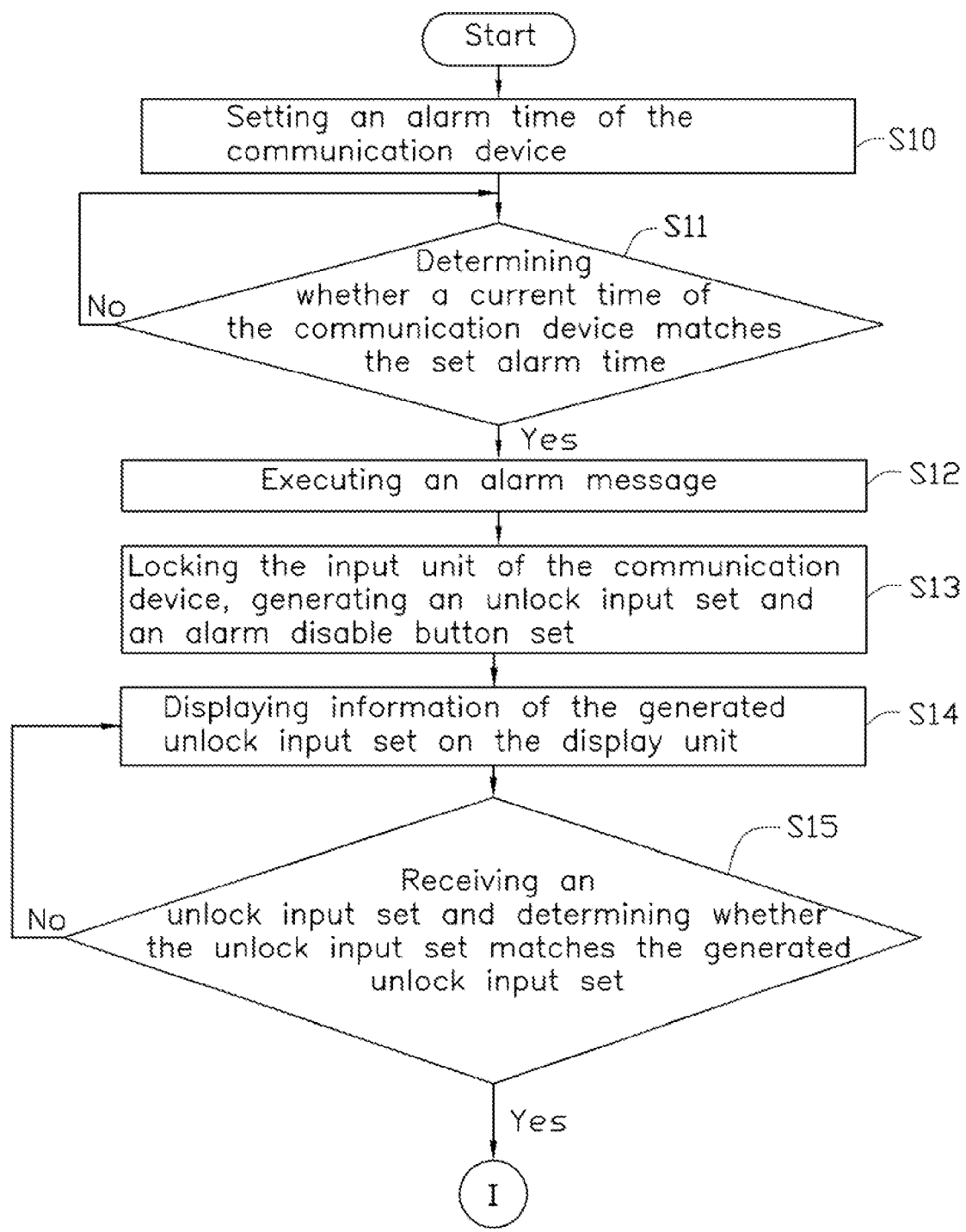
FIG. 2 is a flowchart illustrating one embodiment of a method of unlocking an alarm of a communication device.
Figure 2B:
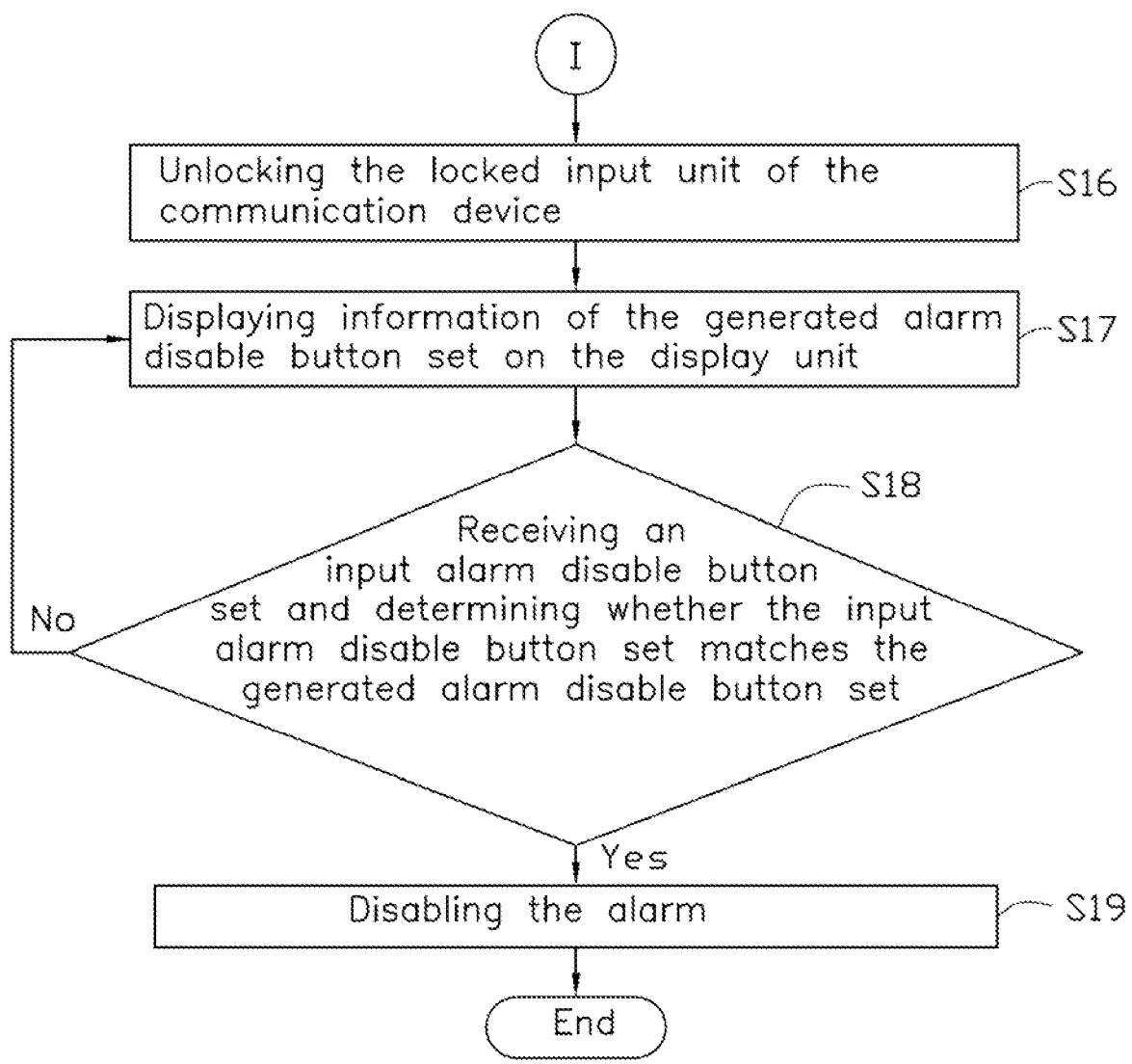

FIG. 2 is a flowchart illustrating one embodiment of a method of unlocking an alarm of the communication device 1. Depending on the embodiment, additional blocks may be added, others deleted, and the ordering of the blocks may be changed.

In block S10, the setup module 100 sets an alarm time of the communication device 1.

In block S11, the setup module 100 determines whether a current time of the communication device 1 matches the set alarm time of the communication device 1. If the current time does not match the set alarm time, block S11 is repeated.

In block S12, the alert module 101 executes an alarm message if the current time matches the set alarm time of the communication device 1.

In block S13, the alarm generating module 102 locks the input unit 12 of the communication device 1, generates an unlock input set to unlock the communication device 1 and an alarm disable button set to disable the alarm. In one embodiment, the unlock input set and the alarm disable button set are composed of external function buttons of the communication device 1, such as a power button, a volume level button and a camera button. In other embodiments, the unlock input set and the alarm disable button set are composed of number keys of the keypad of the communication device 1, such as the number key 0~9.

In block S14, the unlock module 103 sends information of the generated unlock input set for display on the display unit 13 to allow the unlock input set to be input.

In block S15, the unlock module 103 receives the unlock input set by the user and determines whether the unlock input set matches the unlock input set generated by the alarm generating module 102. If the unlock keypad set does not match the generated unlock input set by the alarm generating module 102, block S14 is implemented.

In block S16, the unlock module 103 unlocks the locked input unit 12 of the communication device 1 if the unlock input set matches the generated unlock input set by the alarm generating module 102.

In block S17, the determination module 104 sends information of the generated alarm disable button set displayed on the display unit 13 to allow inputting the alarm disable button set.

In block S18, the determination module 104 receives the alarm disable button set input by the user and determines whether the alarm disable button set matches the alarm disable button set generated by the alarm generating module 102. If the input alarm disable button set does not match the alarm disable button set generated by the alarm generating module 102, block S17 is implemented.

In block S19, If the input alarm disable button set matches the alarm disable button set generated by the alarm generating module 102, the determination module 104 sends a disable signal to the disable module 105 and the disable module 105 disables the alarm of the communication device 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A communication device, comprising:
   a storage unit;
   a display unit;
   at least one processor;
   an input unit;
   one or more programs stored in the storage unit and being executable by the at least one processor;
   an alarm generating module that locks the input unit and generates an unlock input set and an alarm disable button set upon the condition that a current time of the communication device matches a set alarm time of the communication device;
   an unlock module that receives an unlock input set by a user and determines whether to unlock the communication device by comparing the received unlock input set with the generated unlock input set;
   the unlock module further unlocks the locked input unit of the communication device upon detecting the received unlock input set matches the generated unlock input set;
   a determination module that receives an input alarm disable button set and determines whether to disable the alarm by comparing the input alarm disable button set and the generated alarm disable button set; and
   a disable module that disables the alarm upon detecting that the input alarm disable button set matches the generated alarm disable button set.

2. The communication device of claim 1, further comprising:
   a setup module that sets an alarm time of the communication device and determines whether the current time matches the set alarm time; and
   an alert module that executes an alarm message upon the condition that the current time matches the set alarm time.

3. The communication device of claim 1, wherein the unlock module further sends information of the generated unlock input set to the display unit.

4. The communication device of claim 1, wherein the determination module further sends information of the generated alarm disable button set to the display unit.

5. The communication device of claim 1, wherein the input unit is a keypad.

6. The communication device of claim 1, wherein the input unit comprises a plurality of external function buttons.

7. A method of unlocking an alarm of a communication device, the communication comprising an input unit, the method comprising:
- locking the input unit upon the condition that a current time of the communication device matches a set alarm time and generating an unlock input set and an alarm disable button set;
- receiving an unlock input set and determining whether the received unlock input set matches the generated unlock input set;
- unlocking the locked input unit upon detecting that the received unlock input set matches the generated unlock input set;
- receiving an input alarm disable button set and determining whether the input alarm disable button set matches the generated alarm disable button set; and
- disabling the alarm upon detecting that the input alarm disable button set matches the generated alarm disable button set.

8. The method of claim 7, further comprising:
setting the alarm time of the communication device and determining whether the current time matches the set alarm time; and
executing an alarm message upon the condition that the current time matches the set alarm time.

9. The method of claim 7, the method further comprising sending information of the generated unlock input set and the generated alarm disable button set to the display unit.

10. A non-transitory storage medium having stored thereon instructions that, when executed by a processor, causes the processor to perform a method of unlocking an alarm of a communication device, the communication device comprising an input unit, the method comprising:
- locking the input unit upon the condition that a current time of the communication device matches a set alarm time and generating an unlock input set and an alarm disable button set;
- receiving an unlock input set and determining whether the received unlock input set matches the generated unlock input set;
- unlocking the locked input unit upon detecting that the received unlock input set matches the generated unlock input set;
- receiving an input alarm disable button set and determining whether the input alarm disable button set matches the generated alarm disable button set; and
- disabling the alarm upon detecting that the input alarm disable button set matches the generated alarm disable button set.

11. The non-transitory storage medium of claim 10, the method further comprising:
setting the alarm time of the communication device and determining whether the current time matches the set alarm time; and
executing an alarm message upon the condition that the current time matches the set alarm time.

12. The non-transitory storage medium of claim 10, the method further comprising sending information of the generated unlock input set and the generated alarm disable button set to the display unit.

* * * * *